United States Patent [19]
Shockley

[11] 3,712,651
[45] Jan. 23, 1973

[54] KNOT TYING DEVICE
[76] Inventor: Phillip B. Shockley, 3553 Vineland Ave., Baldwin Park, Calif. 91706
[22] Filed: March 10, 1972
[21] Appl. No.: 233,514

[52] U.S. Cl. ................................................. 289/17
[51] Int. Cl. ............................................... D03j 3/00
[58] Field of Search ........................................ 289/17

[56] References Cited

UNITED STATES PATENTS

| 3,043,615 | 7/1962 | Dannebaum | 289/17 |
| 3,326,586 | 6/1967 | Frost et al. | 289/17 |
| 3,353,819 | 11/1967 | Palmer | 289/17 X |

FOREIGN PATENTS OR APPLICATIONS 260,323   5/1963   Australia ..................................... 17/

Primary Examiner—Louis K. Rimrodt
Attorney—Victor C. Muller

[57] ABSTRACT

Knot tying device for fisherman characterized by a pair of resiliently closed jaws for holding hooks and other devices, or a line, while loops in a line are being formed around a tube slideable on a rod having an eye at one end with a slot therein. When the tube closes the slot the loops may be stripped across the rod eye which then pulls the free end of the line beneath the loops.

6 Claims, 8 Drawing Figures

PATENTED JAN 23 1973  3,712,651
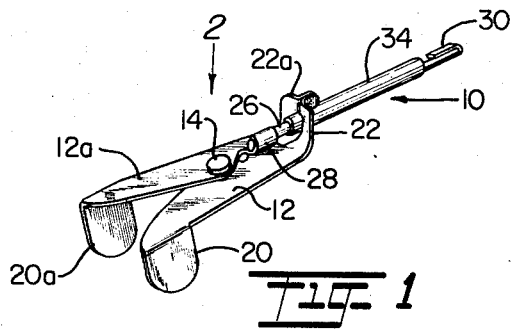
FIG. 1
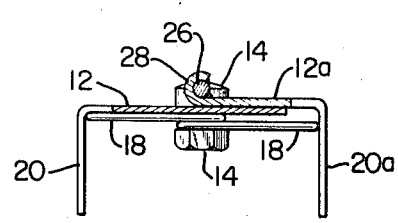
FIG. 5
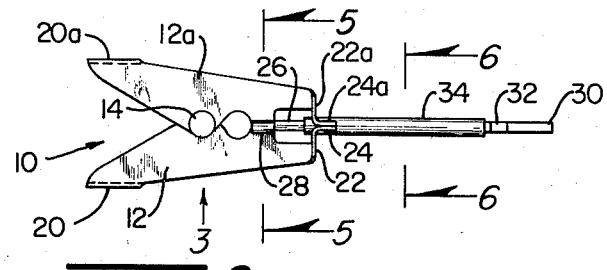
FIG. 2
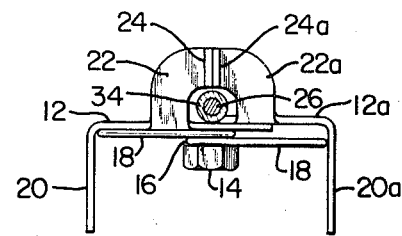
FIG. 6
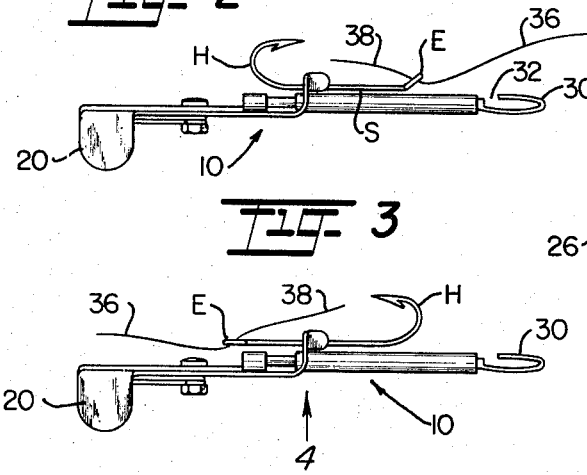
FIG. 3
FIG. 3A
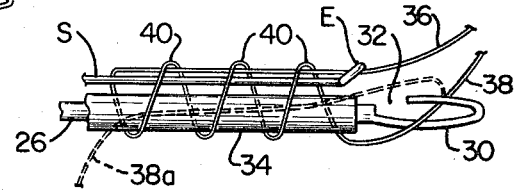
FIG. 7
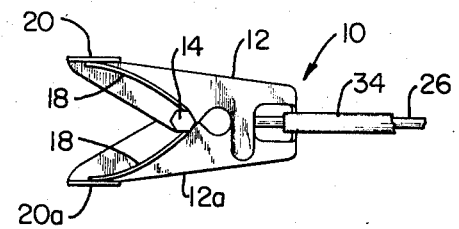
FIG. 4

KNOT TYING DEVICE

BACKGROUND OF THE INVENTION

In the sport or industry of fishing, a fisherman is periodically confronted with forming various knots for securing together various components of his fishing equipment. Conventional examples include: securing the eye of a hook to the end of a fishing line; securing a swivel, ring, lure or other device to the end of a line; splicing lines of the same or different diameters; securing a leader to a fly casting line; and forming a loop on the end of a line or intermediate its ends. The tying of certain of the knots referred to, and others, by hand and without any special devices, is well illustrated and disclosed in technical bulletin No. 3, "Recommended Knots to Use," published by Dupont in connection with "STREN" monofiliment fishing line. Various devices have been proposed or marketed for aiding in the tying of knots, exemplary of which are U.S. Pat. Nos. 2,934,369 to Kennedy and 3,106,417 to Clow.

Hooks, for example, vary greatly in size and configuration depending upon the type of fishing involved. Thus, the fly fishermen may employ a hook, simulating a fly or other insect, designated as, say, number 12 to 16 which may be as small as about one-third inch in overall length, whereas the ocean fisherman may employ a hook an inch or more in overall length. The size of the curved bight which carries the terminal barb may vary as well as the shank length. Flies are generally of the "short shank" variety whereas bait hooks are often of the "long shank" variety. Line diameter and strength also varies between wide limits which may be as little as 1 pound strength to as much as 40 pounds strength, or more. To provide a versatile tying device which will enable the tying of knots in line of various sizes, to devices such as hooks, etc., thus presents a considerable problem.

SUMMARY OF THE INVENTION

Hook tying device characterized by a pair of pivoted scissor-like members having jaws at one end, urged together by a spring, a rod secured at one end to one of the members, the rod having an open eye at its other end, and a tube slideable on the rod for closing the eye, the jaws being so constructed to clamp the shank of a fish hook at any point along its length, clamp the bight of a small hook, clamp swivels, rings, lures, etc or clamp a fly casting line while a leader is being attached thereto. The eye of a hook may be disposed over the tube for tying a snell knot on the hook shank or disposed in a position remote from the tube for tying a clinch knot disposed outwardly of the end of a hook eye. Loops, line splices, and fly line to leader knots may also be tied.

BRIEF DESCRIPTION OF THE DRAWING

FIG. 1 is a perspective of the subject of the invention;

FIG. 2 is a top plan as viewed in the direction of arrow 2, FIG. 1;

FIG. 3 is a side elevation as viewed in the direction of arrow 3, FIG. 2, illustrating one position of a fish hook;

FIG. 3A is a like view illustrating another position of a fish hook;

FIG. 4 is a bottom plan as viewed in the direction of arrow 4, a portion being broken away;

FIG. 5 is an enlarged section taken on line 5—5, FIG. 2;

FIG. 6 is an enlarged section taken on line 6—6, FIG. 2; and

FIG. 7 is a side elevation of a portion of the device, illustrating the manner of tying one of various knots.

DESCRIPTION OF PREFERRED EMBODIMENT

Referring now to the drawing, the subject of the invention comprises a scissor-like device 10 comprising a pair of members 12,12a, pivotally secured together intermediate their ends by a pivot pin 14, such as a screw or rivet, which extends through aligned apertures in the members and which passes through a coil 16 of a torsion spring having legs 18, the ends of which engage finger engaging tabs 20,20a. The right ends of members 12,12a, as best shown in FIGS. 1–3 and 6, are provided with bends 22,22a which terminate in other bends, forming jaws 24,24a which are urged toward closed abutting position by the spring.

One end of a rod 26 is rigidly affixed to member 12a, such as by a curl 28 and a spot weld or solder (not shown). The other end terminates in a hook 30, having a slot 32, which may be closed by a tube 34 which freely slides on rod 26.

Various knots may be tied by the device, several of which will be described as exemplary. Referring to FIGS. 3 and 7 it will be assumed that it is desired to tie a conventional snell knot around shank S of fish hook H having an eye E at one end of the shank. Tabs 20,20a are first squeezed to open jaws 24,24a between which shank S is inserted, the tabs then being released with the hook now being secured to the device as illustrated in FIG. 3. Several inches of the running portion 36 of the line are now threaded through eye E to form a free end 38, also illustrated in FIG. 3. Referring now to FIG. 7, free end 38 is disposed adjacent the jaws and secured between a thumb and forefinger. Three (or more) coils 40 are then formed around the hook shank and tube, securing the coils between the fingers, as formed. Free end 38 is then layed into slot 32 as shown by the full line. The fingers of the right hand, which formed the coils, now squeeze the tabs to open the jaws and the fingers of the left hand slide the coils so formed toward rod hook 30. This motion first slides the tube along the rod until it closes slot 32. Continued relative movement then pulls free end 38a (dotted line) beneath all of coils 40, after which the coils are tightened around shank S and the excess of free end 38a is severed adjacent the knot. In the event the hook is so small that the length of the jaws is as long or longer than the length of shank S, thus preventing a portion of the shank to overly the tube, as shown in FIG. 3, the jaws may then clamp the bight or curve of the hook thus allowing a portion of the shank to overly the tube whereby coils 40 may be wound around same. Thus, fly hooks at least as small as No. 16 may be tied, this being an especially important feature to fly fishermen who employ small flys and small line of a breaking strength of the order of say one to several pounds.

It is now believed apparent that an important feature of the invention resides in the offset position of the jaws relative to the upper plane of the tube and without any obstructions at either side of the jaws, whereby any length hook may be clamped by the jaws with a desired portion of its shank overlying the tube where the coils 40 are to be wound. An example of the foregoing is illustrated in FIG. 3A wherein a long shank hook is clamped with eye E disposed at the left side of the jaws, rather than at the right side, as illustrated in FIG. 3. In tying this knot free end 38 is threaded through eye E, as shown, after which it is coiled around the portion of the shank at the right side of the jaws, as previously described for the snell knot. It is also laid into the slot in the rod hook and pulled beneath the coils 40 in the same manner as previously described. Thereafter the procedure differs, however, in that the coils are stripped across eye E so that they surround the running portion of the line outwardly of the eye rather than surround the hook shank inwardly of the eye. Thus, when the coils are tightened and pulled tightly against the eye they jam against its outer portion. Since this knot is essentially a slip or clinch knot which jams only when it is pulled tightly against the eye it will be apparent that it may be left slightly loose, if desired. Thus, some fishermen prefer a hook which is free to swivel in a line end loop, particularly when using small live bait which thus has greater freedom of movement on a freely pivoted hook, as compared to a hook which is jammed against a knot. As will be apparent, however, when a fish strikes the bait and becomes hooked the pulling force on the hook causes the knot to slide slightly and jam against the outer end of the hook eye.

In the splicing of lines the barrel or blood knot is generally considered as an excellent knot, particularly if the two lines are the same diameter. If they differ considerably in diameter, however, other knots are usually more effective. The present invention provides means for tying a knot which is similar to the blood knot but differs in that the two free ends lie parallel with the running portions rather than crossing in opposite directions at the central portion of the blood knot. It is, in fact, two snell knots, each tied around the running portion of the other line. They thus each form a sliding knot on the running portion of the other line and when both lines are relatively pulled they slide until the knots abut and jam against each other. This knot has been found to be equally effective regardless of difference of line diameters. Briefly, it is tied by crossing the ends of the lines adjacent the tube and tying a snell knot with one end about the other line. The lines are then reversed and a second snell knot is tied with the other end. The two snell knots are now spaced and when the two running portions are pulled relatively the knots slide until they jam against each other.

In addition to the capability of the jaws to hold hooks of various sizes, a fly line, etc., they may also be employed to hold swivels, rings, streamers and other fishing accessories which are to be connected to lines or leaders.

The versatility of the jaw arrangement is further exemplified by the tying of a small leader to the end of a fly casting line of considerably greater diameter. In tying this knot the fly line is clamped in the jaws with its free end extending somewhat beyond the end of the rod hook. The leader is then tied with a snell knot to the fly line overlying the tube and tightened thereon, forming a smooth continuation thereof and without a bulky knot, such as a square knot, often employed for securing a leader end loop to a flyline end loop. Since a snell knot is essentially a slip knot and normally requires that it jam against something (such as a hook eye) it might be expected that this knot might slip. In fact, if it were tied to a metallic hook shank without an eye E it would slip. It does not slip on a fly line, however, since such line is soft and somewhat resilient and the coils surrounding same bite into the soft fly line as they tighten on same with increased relative pulling force.

I claim:

1. A device for aiding in the forming of a knot on a fishing line for securing same to a fishing accessory such as a fish hook having a shank with a bight at one end thereof and an eye at the other end thereof; a swivel or lure having an eye at one end thereof; a ring, a fly casting line, or another line to form a line splice, comprising;
   a. a pair of like adjacent members connected between their ends by a pivot in scissor-like relationship,
   b. a jaw on one end of each member cooperating with the jaw on the other member and between which the accessory may be releasably clamped,
   c. a spring for urging the jaws together, the other ends of the members adapted to be squeezed between fingers of the hand to open same to various distances for clamping accessories of various cross sectional dimensions,
   d. an elongated rod rigidly affixed at its inner end to one of said members and extending outwardly from said jaws, its longitudinal axis substantially intersecting the axis of said pivot,
   e. the outer end of said rod being hook-shaped to form an open slot into which a line may be laid,
   f. a sleeve slideably carried by said rod and movable to a position closing said slot,
   g. said jaws overlying said tube adjacent thereto, providing an unobstructed elongated space at both sides thereof and extending parallel with the rod and sleeve, whereby the jaws may clamp an accessory, such as a hook shank or line at any desired position along its length.

2. A device in accordance with claim 1 wherein said other ends of the members are provided with squeeze tabs adapted to be squeezed by fingers of the hand for opening the jaws.

3. A device in accordance with claim 2 wherein the spring engages the tabs, urging same apart and closing the jaws.

4. A device in accordance with claim 1 wherein the accessory is a fish hook, the shank of which is adapted to be clamped by the jaws at any desired position along its length and with either its eye or its bight overlying the sleeve.

5. A device in accordance with claim 1 wherein the accessory is a fishing line adapted to be clamped by the jaws with its free end overlying the sleeve onto which a leader may be secured.

6. A device in accordance with claim 1 wherein the accessory is a swivel, lure, or other member having a ring at one end thereof adapted to be clamped by the jaws with the ring overlying the sleeve outwardly adjacent the jaws.

* * * * *